United States Patent
Walley et al.

(10) Patent No.: US 9,350,170 B2
(45) Date of Patent: May 24, 2016

(54) SMART POWER MANAGEMENT SYSTEM AND RELATED METHOD

(75) Inventors: John Walley, Ladera Ranch, CA (US); Robert Hulvey, Redondo Beach, CA (US)

(73) Assignee: BROADCOM CORPORATION, Irvine, CA (US)

( * ) Notice: Subject to any disclaimer, the term of this patent is extended or adjusted under 35 U.S.C. 154(b) by 58 days.

(21) Appl. No.: 13/006,160

(22) Filed: Jan. 13, 2011

(65) Prior Publication Data

US 2011/0181401 A1 Jul. 28, 2011

Related U.S. Application Data

(60) Provisional application No. 61/336,844, filed on Jan. 26, 2010, provisional application No. 61/336,845, filed on Jan. 26, 2010.

(51) Int. Cl.
*G08C 19/12* (2006.01)
*H01H 47/00* (2006.01)
(Continued)

(52) U.S. Cl.
CPC .............. *H02J 1/14* (2013.01); *H02J 13/0003* (2013.01); *Y02B 90/228* (2013.01); *Y04S 20/18* (2013.01); *Y10T 307/832* (2015.04)

(58) Field of Classification Search
CPC ... H02J 2007/0096; H02J 7/0055; H02J 7/02; H02J 2007/0098; H02J 2007/62; H02J 7/008; H02J 7/025; H02J 7/0026; H02J 5/005; H02J 7/0068; H02J 7/0031; H02J 7/0004
USPC .............. 340/3.1, 500, 540, 657, 7.33, 13.23, 340/572.1, 825.25; 455/572, 574, 512, 522, 455/127.1, 343.1, 423; 307/31–41, 126, 307/311, 150, 66, 39, 104
See application file for complete search history.

(56) References Cited

U.S. PATENT DOCUMENTS

| 6,754,092 B2 * | 6/2004 | McDowell et al. ............. 363/89 |
| 2006/0271800 A1 * | 11/2006 | Li et al. ......................... 713/300 |

(Continued)

FOREIGN PATENT DOCUMENTS

WO    WO 2010/257224 A1    5/2010

OTHER PUBLICATIONS

Chinese Office Action dated Nov. 22, 2013, in corresponding Chinese application No. 201210004160.4.

*Primary Examiner* — Mirza Alam
(74) *Attorney, Agent, or Firm* — Oblon, McClelland, Maier & Neustadt, L.L.P

(57) ABSTRACT

According to one disclosed embodiment, a smart power management system includes a power conversion unit having a communication module and a power management module that can convert mains power into a form that can be used to power a plurality of electronic devices. In one embodiment, the power conversion unit can selectively disconnect power availability provided for a particular electronic device and reduce phantom load waste by communicating with a connected electronic device and exchanging information. In another embodiment, the power conversion unit can selectively disconnect power availability provided for a particular electronic device by monitoring the electronic device's power usage over time and determining an appropriate power availability based on predetermined power management parameters. In another embodiment, the power conversion unit can communicate with other power conversion units to form a mesh network.

17 Claims, 4 Drawing Sheets

(51) Int. Cl.
*H02J 1/14* (2006.01)
*H02J 13/00* (2006.01)

(56) References Cited

U.S. PATENT DOCUMENTS

| | | | |
|---|---|---|---|
| 2008/0081676 A1* | 4/2008 | Chakraborty | G05B 19/4185 455/574 |
| 2008/0106148 A1* | 5/2008 | Gelonese | 307/39 |
| 2009/0235107 A1* | 9/2009 | Gelonese | G06F 1/3203 713/340 |
| 2009/0271047 A1* | 10/2009 | Wakamatsu | H02J 5/005 700/295 |
| 2010/0019583 A1* | 1/2010 | DuBose | G06F 1/26 307/126 |
| 2010/0146308 A1* | 6/2010 | Gioscia | G06F 1/1632 713/300 |
| 2010/0244576 A1* | 9/2010 | Hillan | G06K 7/0008 307/104 |
| 2011/0057607 A1* | 3/2011 | Carobolante | H02J 7/025 320/108 |
| 2011/0260556 A1* | 10/2011 | Partridge et al. | 307/150 |

* cited by examiner

SMART POWER MANAGEMENT SYSTEM AND RELATED METHOD

RELATED APPLICATIONS

This application is based on and claims priority from U.S. Provisional Patent Application Ser. No. 61/336,844, filed on Jan. 26, 2010, and U.S. Provisional Patent Application Ser. No. 61/336,845, also filed on Jan. 26, 2010, which are hereby incorporated by reference in their entirety.

BACKGROUND OF THE INVENTION

1. Field of the Invention

The present invention is generally in the field of electronic devices and systems. More particularly, the present invention is in the field of delivery of power to electronic devices and systems.

2. Background Art

The use of electronic devices continues to expand into all aspects of daily life, from the ubiquitous personal computer to the ever more sophisticated media entertainment centers found in almost every home. Many such devices are kept in a mode of constant readiness for use, and the cumulative effect of this mode and the ever-increasing number of devices can be a heavy burden on existing energy resources.

Conventional power supplies for electronic devices are typically unconfigurable and feature-poor, perhaps mainly to reduce manufacturing cost, but perhaps also because general safety and liability concerns steer manufacturers towards designing their power supplies to be physically differentiated from product to product so as to limit the risk of damage due to incompatible voltage and current specifications. Because each power supply is typically designed to serve only a very limited market for a limited amount of time (e.g., the life of a single product), little effort may be put into designing high efficiency into each iteration of the generic power supply. Further, in the case of portable electronic devices, the lack of interchangeability frequently leads to consumers having multiple collections of power supplies at, for example, home and work, and each collection is often left plugged into the mains, which constantly draws power from the grid.

Thus, there is a need to overcome the drawbacks and deficiencies in the art by providing a power management system that can be readily adapted to power various electronic devices efficiently, accurately and conveniently.

SUMMARY OF THE INVENTION

The present invention is directed to a smart power management system and related method, substantially as shown in and/or described in connection with at least one of the figures, as set forth more completely in the claims.

DETAILED DESCRIPTION OF THE INVENTION

Figure 1:
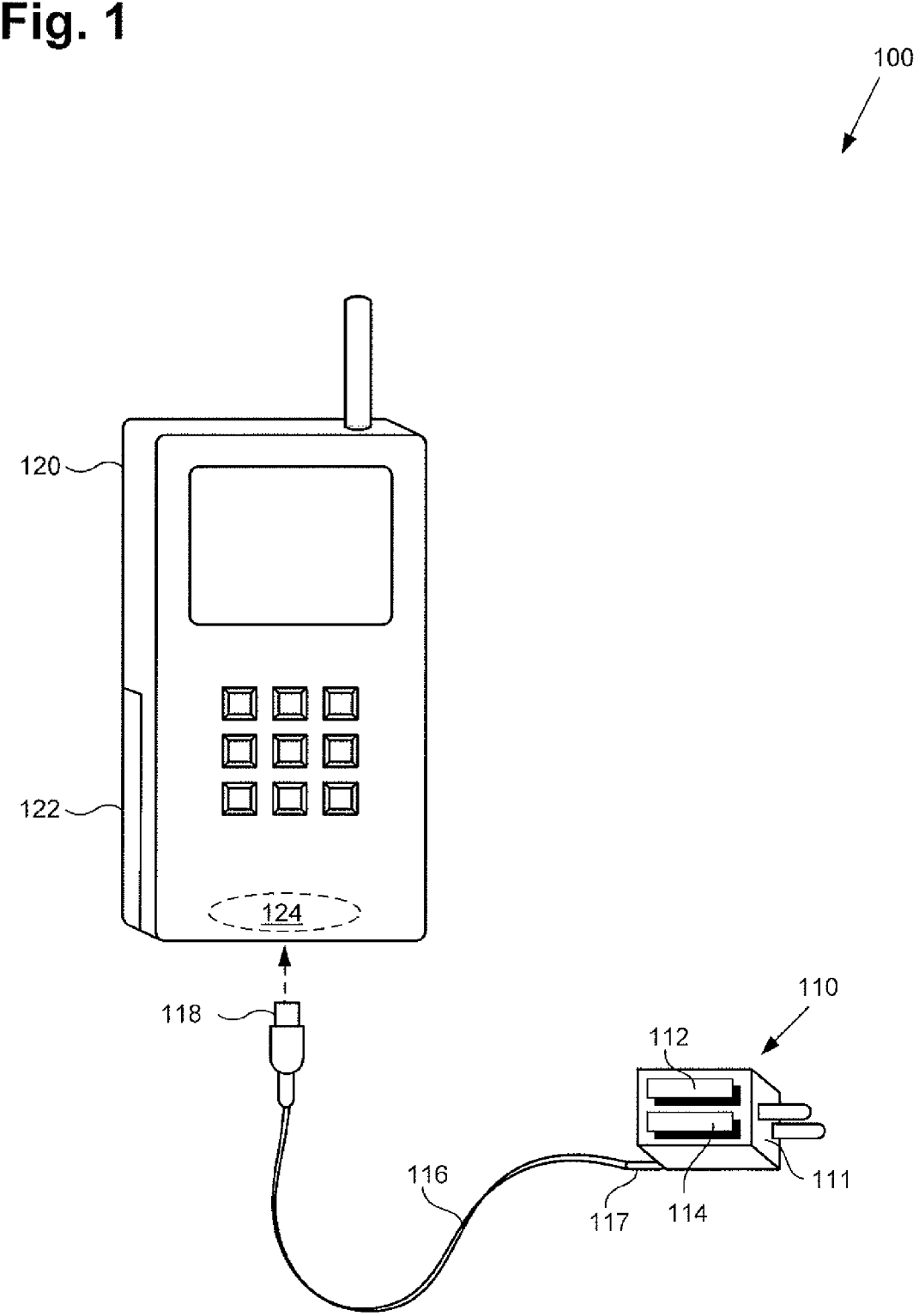
FIG. 1 illustrates a modular view of a smart power management system, according to one embodiment of the present invention.

The present invention is directed to a smart power management system and related method. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention.

The drawings in the present application and their accompanying detailed description are directed to merely exemplary embodiments of the invention. To maintain brevity, other embodiments of the present invention are not specifically described in the present application and are not specifically illustrated by the present drawings. It should be understood that unless noted otherwise, like or corresponding elements among the figures may be indicated by like or corresponding reference numerals. Moreover, the drawings and illustrations in the present application are generally not to scale, and are not intended to correspond to actual relative dimensions.

Conventional power supplies suffer from many inefficiencies tied to their inability to be used universally. For example, at the end of the life of a typical electronic device, its power supply is often simply thrown away because it cannot function with other electronic devices. Knowing this, manufactures typically build their power delivery systems as cheaply as possible, which precludes incorporating efficiency management into conventional power supply designs. As a result, conventional power supplies are often manufactured so that their maximum output power rating is constantly available, regardless of whether an electronic device is being powered or not. This constant high power availability can act as a phantom load, as known in the art, and waste significant amounts of electrical power because it siphons off a percentage of the maximum power rating while the electronic device itself is turned off, disconnected, or in a low power-usage or sleep mode.

FIG. 1 illustrates a modular view of one embodiment of the present invention that is capable of overcoming the drawbacks and deficiencies of the conventional art. Smart power management system 100 includes power conversion unit (PCU) 110 and wired power conduit 116, which are shown in combination with electronic device 120, in FIG. 1. According to the embodiment shown in FIG. 1, PCU 110 can be configured to connect to a mains alternating current (AC) power line through a standard wall mounted electrical socket, using mains adapter 111, and to provide power to electronic device 120 using wired power conduit 116. Together, PCU 110 and electronic device 120 form a portable electrical usage environment that may comprise, for example, a desktop workspace.

As shown in FIG. 1, wired power conduit 116 can be connected to PCU 110 through connector 117, which may be a fixed connection or a detachable modular connection, such as through a Universal Serial Bus (USB) interface plug-in connector, for example. Wired power conduit 116 can connect PCU 110 to electronic device 120 through modular connector 118, which may be a mini-USB connector, for example, or any modular connector suitable for providing an interface between wired power conduit 116 and an electronic device or system receiving power. Wired power conduit 116 can serve as a power transfer connection between PCU 110 and electronic device 120 and can be used to transfer power to power control circuitry 124 of electronic device 120 to operate electronic device 120 and/or charge battery 122 of electronic device 120.

It is noted that although the embodiment shown in FIG. 1 represents PCU 110 in combination with a particular electronic device, e.g., electronic device 120, that representation is provided merely as an example. More generally, PCU 110 may be used to provide power to a plurality of various individual electronic devices and/or systems, each having its own specific power requirements. Alternatively, PCU 110 may be a dedicated device configured to provide a variable output to a single electronic device or system. In any implementation, however, PCU 110 is configured to support a communication channel between itself and the electronic devices or systems to which it is connected.

As shown in FIG. 1, according to the embodiment of smart power management system 100, PCU 110 includes communication module 112 and power management module (PMM) 114. Communication module 112 can be configured to send and receive information (e.g., power management parameters, state information and/or power monitoring data, for example) between electronic device 120 and PMM 114 over a communication channel established between PCU 110 and electronic device 120.

In embodiments such as that shown in FIG. 1, in which power is transferred from PCU 110 to electronic device 120 over a wired power conduit (e.g., wired power conduit 116) the wired power conduit may also provide the communication channel for transfer of information. In different embodiments, power may instead be transferred from PCU 110 to electronic device 120 through a wireless power conduit (not shown in FIG. 1) by inductive coupling, or resonant inductive coupling, for example, as known in the art. In those embodiments, communication module 112 can be configured to use a wireless power conduit as a wireless communication channel. Communication module 112 can also be configured to support a separate wireless communication channel to electronic device 120, such as through a Bluetooth, Bluetooth LE, WiFi, Near Field Communication (NFC), or other suitable wireless communication protocol, for example, either in addition to or as an alternative to a communication channel formed over a power conduit.

PMM 114 may comprise, for example, a microcontroller having multiple digital and analog input/output ports coupled to communications module 112 and, for example, to a programmable variable power supply, as known in the art. PMM 114 can be configured to use information received from communication module 112 to dynamically modify output power characteristics (e.g., current and voltage levels) of power delivered to electronic device 120 as well as modify a power availability provided for electronic device 120 in order to reduce, for example, electrical power waste due to phantom load effects, as described above. In addition, PMM 114 can be configured to periodically monitor output power characteristics of power delivered to electronic device 120 as well as an overall power draw of PCU 110 and a power availability provided for electronic device 120 and communicate such power monitoring data to, for example, electronic device 120.

In one example, the presence of communication module 112 and PMM 114 can be used to enable PMM 114 to adjust the output power characteristics of power delivered to electronic device 120 according to information (e.g., a requested output power characteristic) received from electronic device 120 over a communication channel. Consequently, embodiments of the present invention can be used to provide power to many different electronic devices, which dramatically extends the useful lifetime of PCU 110 while reducing a need for multiple conventional matched power supplies.

In another example implementation, PMM 114 can be configured to modify a power availability provided for electronic device 120 in order to conserve power while meeting the varying needs of electronic device 120. In one embodiment of the present inventive concepts, PMM 114 can comprise two power supplies: a relatively high power programmable "primary" power supply that can be programmatically switched in and out of a power delivery path to a connected electronic device (e.g., electronic device 120), and a relatively low power "supervisory" power supply that can be configured to provide enough power to enable communications module 112 and PMM 114 to function even if a primary power supply is switched out.

For instance, if electronic device 120 communicates notice that it can be unpowered indefinitely, or if it specifically requests a reduced power availability until some future time or some future communication event (e.g., because it can use stored power from battery 122 in the interim), PMM 114 can switch out a primary power supply used to power electronic device 120 until some future time or event, thereby eliminating a phantom load waste due to the primary load supply. Upon reaching that future time or experiencing that event, PMM 114 can then switch in a primary power supply to re-charge battery 122, for example, or to power electronic device 120 during a particularly power-hungry mode.

While a primary power supply is unpowered, communication module 112 and PMM 114 can be configured to use power from a supervisory power supply to, for example, keep track of time, or to monitor a communication channel for a communication event. PMM can also be configured to use a supervisory power supply to apply a safe mode to a connected electronic device in order to stay in communication with the device while a primary power supply is switched out (e.g., if a connected device does not or cannot employ an internal battery to power its communication circuitry). Such a safe mode can comprise, for example, a standardized output voltage expected at an initial power conduit connection (e.g., before any communication takes place), such as a nominal 5 V, coupled with a minimal peak current setting, such as 5-10 mA or 100-500 mA, for example, depending upon the particular implementation environment. In any event, the peak current setting is suitably, selected so as to be small enough to preclude any electrical damage yet be sufficient to power, for example, a connected electronic device's standardized communication circuitry.

Under alternative circumstances, electronic device 120 can send periodic status updates (e.g., existing state information for electronic device 120) to PMM 114, and if a status update indicates, for example, a fully charged battery 122 and minimal power requirements (e.g., minimal as compared to typical power requirements, also communicated by electronic device 120) over a predetermined period of time, PMM 114 can be configured to switch out a primary power supply until, for example, electronic device 120 communicates that its battery is undercharged by some predetermined percentage of its total capacity. PMM 114 can be configured to determine each of the above modes of operation through communication between electronic device 120 and PMM 114, for example, or through additional communication between PMM 114 and a separate electronic device (not shown in FIG. 1) that may be used, for example, to set predetermined power management parameters (e.g., a predetermined period of low power usage, or a predetermined undercharge percentage).

In another example, the present inventive concepts enable PMM 114 to periodically monitor, for example, particular output power characteristics (e.g., current and voltage levels) of power delivered to electronic device 120, an existing overall power draw of PCU 110, and/or a power availability provided for electronic device 120. PMM 114 can be configured to use such power monitoring data to determine whether to modify a power availability provided for electronic device 120 due to, for example, minimal power draw by electronic device 120 over a predetermined period of time, similar to the operating mode of PMM 114 described above with respect to periodic status updates. In addition, PMM 114 can be configured to communicate power monitoring data to electronic device 120, for example, allowing electronic device 120 to further process and analyze the power monitoring data and, for example, communicate updated power management parameters back to PMM 114. Although not explicitly shown in FIG. 1, PMM can also be configured to communicate power monitoring data to any electronic device in communication with PCU 110, including an electronic device not powered by PCU 110.

Figure 2:
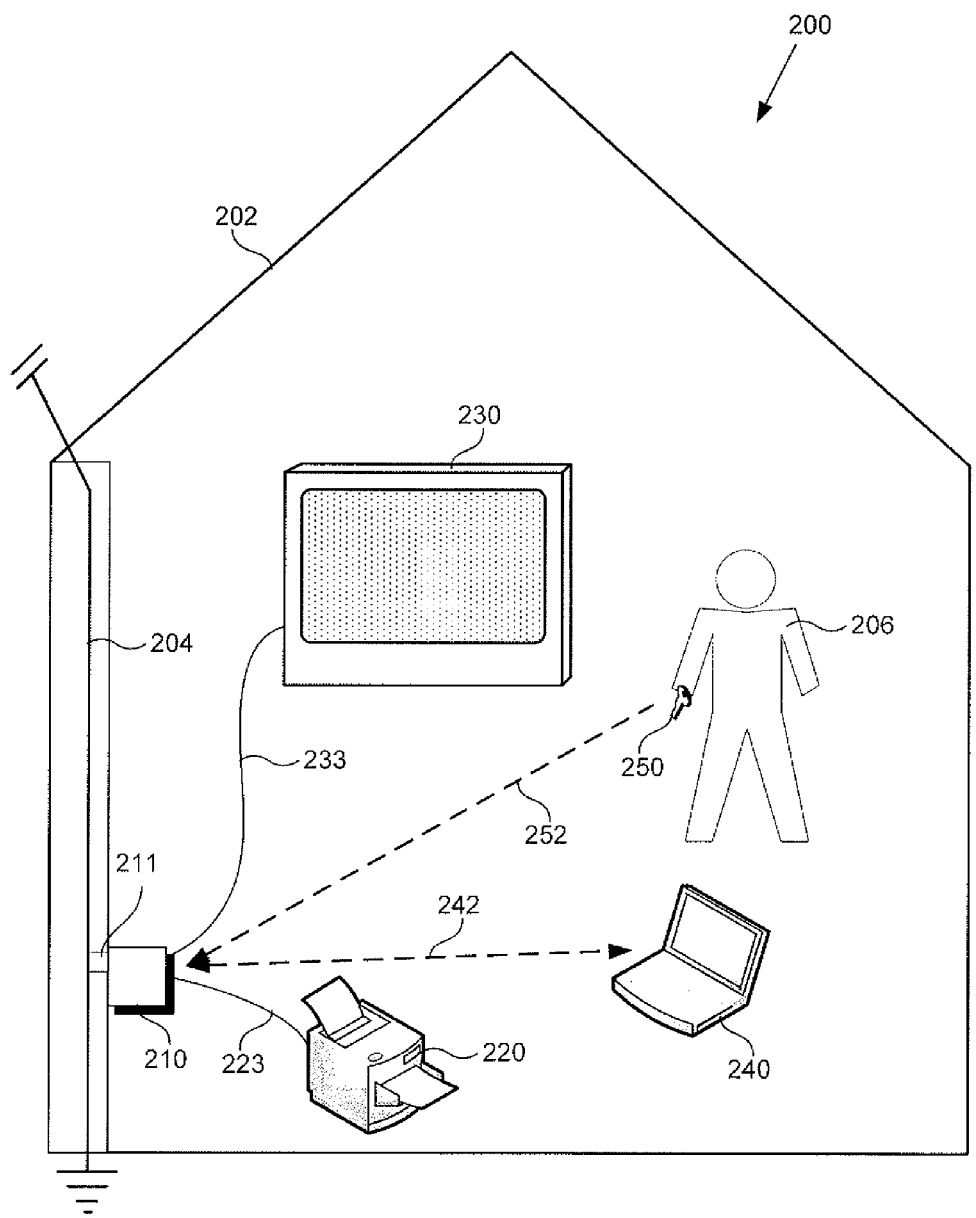
FIG. 2 illustrates a modular view of a smart power management system, according to a second embodiment of the present invention.

FIG. 2 illustrates an example of a smart power management system, according to another embodiment of the present inventive principles, which manages a plurality of power transfer connections to a corresponding plurality of electronic devices. As shown in FIG. 2, electrical usage environment 200 includes PCU 210, which may comprise a communications module and a PMM (not explicitly shown in FIG. 2) similar to those found in PCU 110 of FIG. 1, and can be configured to draw power from mains 204 through mains adapter 211. Also included in electrical usage environment 200 are printer 220 and television 230 connected to PCU 210 through respective wired power conduits 223 and 233, and laptop 240 and key fob transmitter 250 held by person 206, where laptop 240 and key fob transmitter 250 are connected to PCU 210 through respective wireless communication channels 242 and 252. As depicted in FIG. 2, every element of electrical usage environment 200 is also an element of a local environment 202 (e.g., a room in a residence or the entirety of the residential premises). PCU 210, mains adapter 211, printer 220 and television 230, and wired power conduits 223 and 233 correspond respectively to PCU 110, mains adapter 111, electronic device 120 and wired power conduit 116, in FIG. 1. Likewise, each of the advantageous features enabled by use of PCU 110, as described above, can also be enabled by use of PCU 210, but with respect to printer 220 and television 230, as explained more fully below.

In embodiments such as that shown in FIG. 2, in which PCU 210 is configured to communicate with electronic devices it powers (e.g., printer 230 and television 240) as well as to devices it does not power (e.g., laptop 240 and key fob transmitter 250), PCU 210 can be configured to combine information from any sources within electrical usage environment 200, for example, to determine an operating mode configured to conserve electrical power.

For instance, printer 220 and television 230 can transmit their individual desired output power characteristics as well as their status updates, as described with electronic device 120 above, and PCU 210 can be configured to modify power availability provided for either device based on that information alone, or that information combined with power monitoring data, as described above. Alternatively, PCU 210 can additionally be configured to detect a communication link with laptop 240 and retransmit all information (e.g., power monitoring data as well as communication link status) to laptop 240 for further processing and analysis.

Upon receipt of the information, laptop 240 may, for example, recognize that printer 220 is a printer that it uses and communicate to PCU 210 that a power availability status of printer 220 should be associated with, for example, an active communication link between PCU 210 and laptop 240. A power availability status may comprise, for example, a high, low, or safe power availability status where, for example, primary and supplemental power supplies can be correspondingly switched into or out of a power delivery path for, for example, printer 220. Subsequent to receiving a communication of such an association, PCU 210 can be configured, for example, to switch a primary power supply into or out of the power delivery path between mains adapter 211 and printer 220 based on a communication link status with laptop 240, thereby reducing overall phantom load waste when printer 220 is not used. Moreover, in instances in which PCU 210 acts to disconnect power from or reduce power to any one or more of printer 220, television 230, or laptop 240, for example, PCU 210 may be configured to forewarn the affected devices ahead of implementing the change, in order to enable their graceful powerdown.

To illustrate another possible operating mode for PCU 210 that can conserve electrical power, PCU 210 can also be configured to associate, for example, proximity of a portable wireless transmitter (e.g., key fob transmitter 250) to the power availability status of a particular powered device (e.g., television 230) or a collection of powered devices. To determine proximity of key fob transmitter 250, PCU 210 can be configured to measure a carrier wave amplitude of communication channel 252 with key fob transmitter 250, for example, and compare the measured amplitude to a standard broadcast amplitude, as communicated by key fob transmitter 250 for example, and thereby estimate a proximity of key fob transmitter 250, as known in the art. Based on the estimated proximity and, for example, a predetermined radius of residential room 202, PCU 210 can be configured to determine whether key fob transmitter 250 is within electrical usage environment 200 and, for example, selectively apply a particular power availability status to television 230. By disconnecting power availability from television 230 while key fob transmitter 250 (and, by inference, person 206) is outside electrical usage environment 200, for example, PCU 210 can significantly reduce phantom load waste within electrical usage environment 200 while television 230 is unused.

Figure 3:
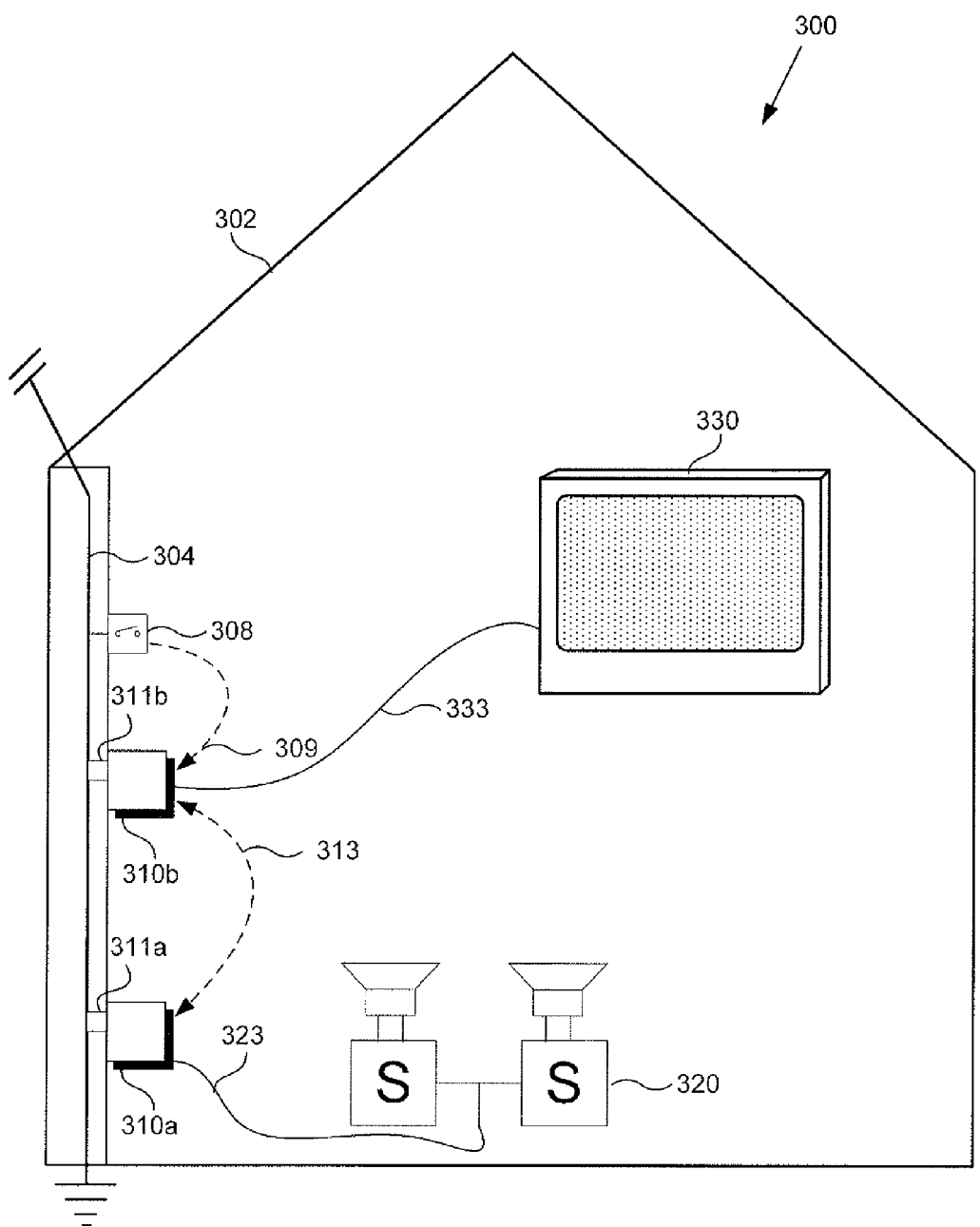
FIG. 3 illustrates a modular view of a smart power management system, according to a third embodiment of the present invention.

FIG. 3 illustrates an example of a smart power management system, according to yet another embodiment of the present inventive principles, which, like the embodiment depicted in FIG. 2, powers a plurality of electronic devices, but where the system includes multiple PCUs. The smart power management system present in electrical usage environment 300 includes PCUs 310a and 310b, which are configured to draw power through respective mains adapters 311a and 311b, and which can each comprise a communication module and a PMM, as with PCU 210 above. Also shown in FIG. 3 are local environment 302, mains 304, wireless wall switch 308, and typical household electronic devices such as audio amplifier 320 and television 330 connected to respective PCUs 310a and 310b through respective wired power conduits 323 and 333. Electrical usage environment 300, mains 304, PCUs 310a and 310b, and mains adapters 311a and 311b correspond respectively to electrical usage environment 200, mains 204, PCU 210, and mains adapter 211, in FIG. 2. Likewise, each of the advantageous features enabled by use of PCU 210, as described above, can also be enabled by use of PCUs 310a and 310b, but with separately connected audio amplifier 320 and television 330, as described more fully below.

In embodiments such as that shown in FIG. 3, in which multiple PCUs each provide power to different electronic devices (e.g., PCU 310a providing power to audio amplifier 320 and PCU 310b providing power to television 330), the PCUs can be configured to communicate with each other as well as with their respective connected electronic devices. The resulting shared information can be used to determine individual or collective operating modes, similar to the operating modes described above, that are configured to conserve electrical power for all the electronic devices powered by the PCUs.

For example, PCUs 310a and 310b can be configured to form a mesh network by, for example, forming a wireless communication channel (e.g., wireless communication channel 313) with one another in order to share information, as known in the art. Once a mesh network is established, PCUs 310a and 310b can be configured, for example, to modify power availabilities provided to audio amplifier 320 and television 330 independently (e.g., based on device requests, power monitoring data, or proximity to a portable wireless transmitter, as described above), or to associate the power availabilities so that both can be modified substantially simultaneously.

For instance, PCU 310b may be configured to associate a status of a wireless switch (e.g., wireless wall switch 308) with, for example, a power availability status for television 330, and PCU 310b may be configured to associate a power availability status for audio amplifier 320 with, for example, the same for television 330, or with a status of wireless wall switch 308. Upon wireless wall switch 308 being switched off, it can communicate this status to PCU 310b over wireless communication channel 309, for example, and PCU 310b may correspondingly switch out a primary power supply used to power television 330. PCU 310b can also communicate the status of wireless wall switch 308 and/or a power availability status for television 330 to PCU 310a over wireless communication channel 313, for example, and PCU 310a can correspondingly modify power availability provided for audio amplifier 320. By choosing any one of the above operating modes, including a mode for establishing a mesh network, PCUs 310a and 310b can significantly reduce phantom load waste within electrical usage environment 302 while audio amplifier 320 and television 330 are not being used, and do it with the convenience of a simple wall switch such as wireless wall switch 308.

It is noted that one advantage of the smart power system of FIG. 3 lies in merging the functionality of PCUs 310a and 310b with the delivery of power from mains 304. For example, implementation of a mesh network, such as that represented in FIG. 3, enables flexible and responsive control over a wide variety of powered devices throughout electrical usage environment 300 in a manner that is largely transparent to a user. Moreover, as distinguishable from conventional mechanisms for managing the power state of more than one powered device at one time, such as a universal remote controller, for example, configured to utilize power management features integrated into each individual powered device, modular consolidation of power control through use of PCUs 310a and 310b implemented as part of a mesh network can provide power management across the substantial entirety of electrical usage environment 300 dynamically.

Although the embodiment of the present inventive concepts depicted in FIG. 3 shows only a single electrical usage environment (e.g., electrical usage environment 300) comprising local environment 302 and a mesh network comprising only PCUs 310a and 310b, other embodiments may include multiple rooms or otherwise delineated areas situated substantially adjacent to each other, such that PCUs within adjacent areas may be configured to form communication links with each other. A resulting mesh network may comprise, for example, a single electrical usage environment encompassing an entire property (e.g., a residence with many rooms), or a mesh network may serve to connect multiple electrical usage environments situated within a particular property. The PCUs participating in the mesh network can be configured to conserve electrical power across the entire property, single rooms, or any subsets of delineated electrical usage environments by, for example, associating proximity or switch status, as described above, with a power availability status assigned to a single electronic device, a single PCU, a single electrical usage environment, or for any multiples of each.

The PCUs participating in the mesh network can also be configured to periodically propagate individual or collective operating modes (e.g., associations with proximity and/or an existing proximity status) and any power monitoring data throughout the mesh network including, for example, to any electronic device in communication with a constituent PCU. The above multiple layers of organization and monitoring provided by the present inventive concepts allow for a convenient, coordinated and extensive system for conserving electrical power.

In addition, the PCUs, which may be wireless Bluetooth enabled units, for example, can be utilized to remotely disconnect power from devices not directly receiving power from them. For example, detection of the proximity of a key fob transmitter, such as key fob transmitter 250, in FIG. 2, in a room within electrical usage environment 300 served by PCU 310a, in FIG. 3, may cause PCU 310a to disconnect power to television 330 located in another room of electrical usage environment 300, by wireless communication with PCU 310b through which television 330 is powered. In an analogous manner, a network of PCUs in wireless network communication could act to power up and power down lighting and/or electronic devices as an occupant of electrical usage environment 300 changes location within that environment. Moreover, in one embodiment, wireless, e.g., Bluetooth enabled PCUs 310a and 310b may also include integrated TRIAC circuitry to further enhance their ability to manage power distribution in the face of varying power demands from the devices they respectively support.

Figure 4:
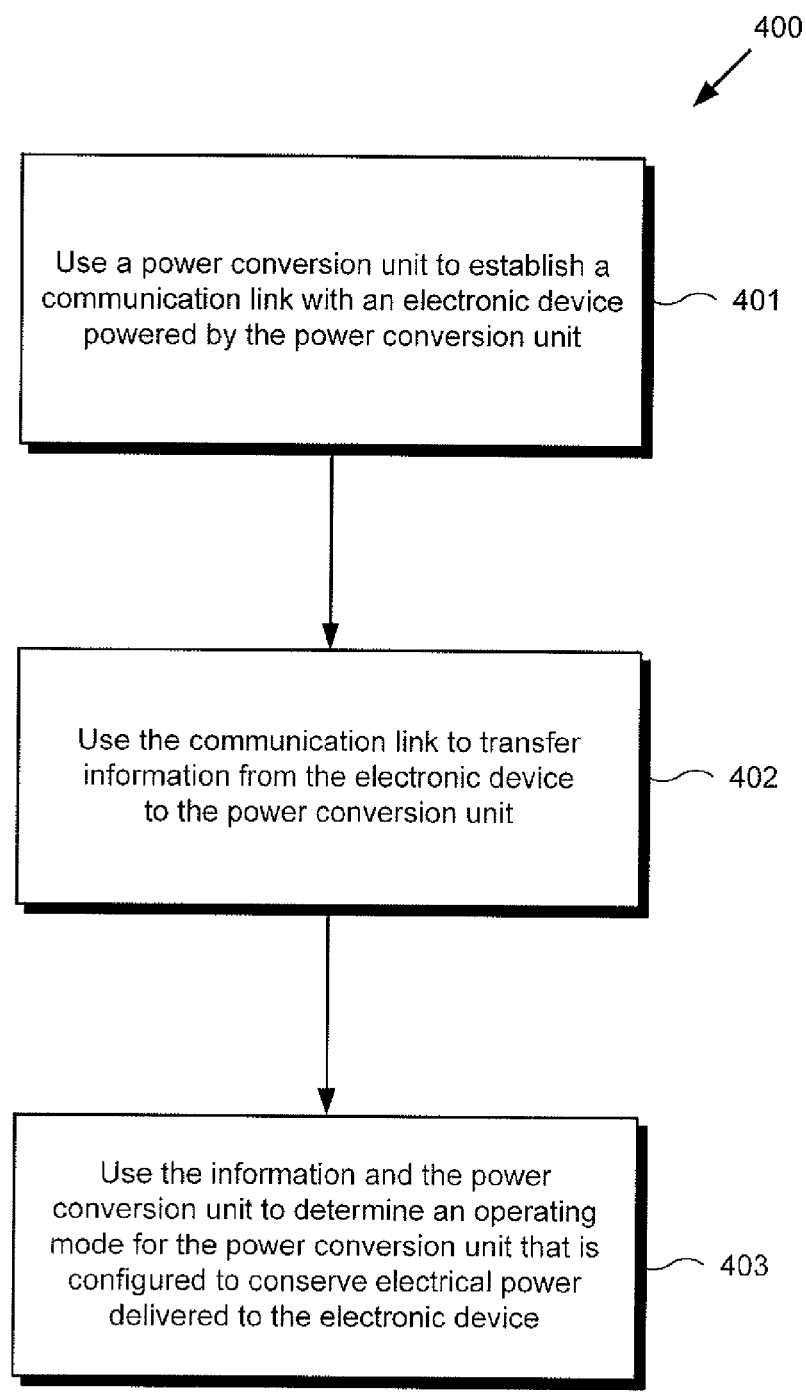
FIG. 4 shows a flowchart illustrating steps taken to implement a method for conserving electrical power, according to an embodiment of the present invention.

FIG. 4 shows a flowchart illustrating a method for conserving electrical power according to an embodiment of the present invention. Certain details and features have been left out of flowchart 400 that are apparent to a person of ordinary skill in the art. For example, a step may consist of one or more substeps or may involve specialized equipment or materials, as known in the art. Steps 401 through 403 indicated in flowchart 400 are sufficient to describe one embodiment of the present invention; however, other embodiments of the invention may make use of steps different from those shown in flowchart 400.

Referring now to step 401 of the method embodied in FIG. 4, step 401 of flowchart 400 comprises using a PCU to establish a communication link with an electronic device that is powered by the PCU. The PCU can comprise a communication module and a PMM, and can be configured to draw power from a mains adapter, such as the PCUs described above. The electronic device may be, for example, any powered electronic device, and it may or may not include an internal power storage device, such as a battery. The communication link may be over a wired or wireless power conduit, a wired or wireless communication channel, or any combination of those, and can be established, for example, through a cooperative effort between a communication module and a PMM.

Continuing with step 402 in FIG. 4, step 402 of flowchart 400 comprises using the communication link to transfer information from the electronic device to the PCU. Upon a communication link being established, as described in step 401, the electronic device may initiate a transfer of information by, for example, requesting a reduced power availability for a period of time or until some event occurs. Information transfer may continue throughout the time that the communication link exists.

Moving now to step 403 in FIG. 4, step 403 of flowchart 400 comprises using the transferred information and the PCU to determine an operating mode for the PCU that conserves electrical power delivered to the electronic device. For example, if the transferred information comprises notice by the electronic device that it can operate at a reduced power availability for a particular period of time, the PCU may use that information to select an operating mode where, for example, a primary power supply is switched out of a power delivery path for the electronic device during the period of time. By entering such an operating mode, the PCU conserves electrical power delivered to the electronic device by reducing the phantom load waste associated with a larger power availability, as described above.

Therefore, by providing a smart power management system having the ability to communicate with and monitor the power delivered to connected electronic devices, and also having the ability to programmatically adjust output power characteristics as well as power availability in response to those communications and monitoring, the present inventive concepts provide a system that can significantly reduce waste of electrical power. Additionally, by providing a system that can establish a mesh network and share information across the network, the present inventive concepts enable an additional level of logistical organization of electrical loads that can further reduce waste of electrical power while increasing overall convenience.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

What is claimed is:

1. A smart power management system comprising:
a power conversion unit (PCU) comprising a primary power supply and a separate supervisory power supply, each configured to simultaneously provide power to a first electronic device through a power delivery path and also provide power to a second electronic device, the supervisory power supply having a lower power delivery capacity than the primary power supply but sufficient to power the first electronic device and the second electronic device to communicate with the PCU when the primary power supply is switched out;
the PCU further configured to use an information received in a communication to continue to provide power via the supervisory power supply and to selectively switch out the primary power supply from the power delivery path to modify an output power of the PCU availability provided to the first electronic device in order to conserve electrical power but maintain power to the second electronic device, wherein the PCU is also configured to determine a proximity to a portable wireless transmitter based on a measured strength of a wireless transmission from the portable transmitter; and
a second PCU configured to communicate with and power at least one other electronic device, wherein
the PCU and the second PCU further configured to form a mesh network and use a shared information communicated over the mesh network to selectively switch out the primary power supply from the power delivery path to modify the output power availability provided to at least one of the first electronic device and the second electronic device.

2. The smart power management system of claim 1, wherein the portable wireless transmitter comprises a key fob, and where a proximity of key fob to the PCU is associated with a power availability status for at least one of the first electronic device and the second electronic device.

3. The smart power management system of claim 1, further comprising a wireless switch, where a status of the wireless switch is associated with a power availability status for at least one of the first electronic device and the second electronic device.

4. The smart power management system of claim 1, wherein the PCU is further configured to periodically monitor an output power characteristic of power delivered to at least one of the first electronic device and the second electronic device.

5. The smart power management system of claim 4, wherein the PCU is further configured to communicate the output power characteristic to at least one other electronic device.

6. The smart power management system of claim 1, wherein the PCU is further configured to periodically monitor a power availability status for at least one of the first electronic device and the second electronic device.

7. The smart power management system of claim 6, wherein the PCU is further configured to communicate the power availability status to at least one other electronic device.

8. A power conversion unit (PCU) for use in a smart power management system, the PCU comprising:
a communication module;
a power management module (PMM) comprising a primary power supply and a separate supervisory power supply, each configured to simultaneously provide power to a first electronic device through a power delivery path and also provide power to a second electronic device, the supervisory power supply having a lower power delivery capacity than the primary power supply but sufficient to power the first electronic device and the second electronic device to communicate with the PCU when the primary power supply is switched out;
the communication module and the PMM configured to communicate with and power the first electronic device and the second electronic device;
the communication module and the PMM further configured to use an information from a communication to continue to provide power through the supervisory power supply and to selectively switch out the primary power supply from the power delivery path to modify an output power of the PCU provided to the first electronic device in order to conserve electrical power but maintain power to the second electronic device, wherein the PCU is also configured to determine a proximity to a portable wireless transmitter based on a measured strength of a wireless transmission from the portable transmitter, wherein the PCU is configured to communicate with a plurality of electronic devices situated within an electrical usage environment to establish a mesh network comprising the PCU and a second PCU, the PCU is configured to communicate shared information with the second PCU over the mesh network, and first and second operating modes corresponding respectively to the PCU and the second PCU are determined using the shared information so as to conserve electrical power within the electrical usage environment.

9. The PCU of claim 8, wherein the PMM is configured to power at least one of the first electronic device and the second electronic device using a wired power conduit.

10. The PCU of claim 8, wherein the PMM is configured to power at least one of the first electronic device and the second electronic device using a wireless power conduit.

11. The PCU of claim 8, wherein the communication module is configured to communicate with at least one of the first electronic device and the second electronic device over a communication channel formed over a power conduit.

12. The PCU of claim 8, wherein the communication module is configured to communicate with at least one of the first electronic device and the second electronic device over a wireless communication channel formed separate from a power conduit.

13. The PCU of claim 8, wherein the information comprises an output power characteristic requested by at least one of the first electronic device and the second electronic device, the communication module and the PMM further configured to provide power having the output power characteristic to at least one of the first electronic device and the second electronic device.

14. The PCU of claim 8, wherein the communications module and the PMM are further configured to form a mesh network with at least a second PCU.

15. A method for use by a smart power management system to conserve electrical power, the method comprising:

establishing, using a power conversion unit (PCU), a communication link with a first electronic device and a second electronic device powered by the PCU through a power delivery path, said PCU comprising a primary power supply and a separate supervisory power supply connected to said power delivery path;

transferring an information from at least one of the first electronic device and the second electronic device to the PCU, using the communication link;

determining an operating mode for the PCU that conserves electrical power delivered to the first electronic device by continuing to provide power through the supervisory power supply and switching out the primary power supply from the power delivery path to modify an output power of the PCU provided to the first electronic device, using the transferred information and the PCU while maintaining power to the second electronic device, wherein the supervisory power supply having a lower power delivery capacity than the primary power supply but sufficient to power the first electronic device and the second electronic device to communicate with the PCU when the primary power supply is switched out, the PCU is also configured to determine a proximity to a portable wireless transmitter based on a measured strength of a wireless transmission from the portable transmitters;

using the PCU and a second PCU in communication with a plurality of electronic devices situated within an electrical usage environment to establish a mesh network comprising the PCU and the second PCU;

transferring a shared information between the PCU and the second PCU over the mesh network;

determining first and second operating modes corresponding respectively to the PCU and the second PCU, using the shared information, wherein the first and second operating modes are determined so as to conserve electrical power within the electrical usage environment.

16. The method of claim 15, wherein the transferred information comprises a notice by the first electronic device that the first electronic device is prepared to enter an unpower state.

17. The method of claim 15, wherein the first and second operating modes impose a single power availability status throughout the electrical usage environment.

* * * * *